United States Patent
Sripathy et al.

(10) Patent No.: US 11,627,012 B2
(45) Date of Patent: Apr. 11, 2023

(54) HOME AUTOMATION MANAGEMENT SYSTEM

(71) Applicant: NewTekSol, LLC, Philadelphia, PA (US)

(72) Inventors: Sampath Iyengar Sripathy, Philadelphia, PA (US); Ganesh Prasad Hariharbhat Okade, Bangalore (IN); Kaviarasan Magendiran, Bangalore (IN)

(73) Assignee: NEWTEKSOL, LLC, San Jose, CA (US)

(*) Notice: Subject to any disclaimer, the term of this patent is extended or adjusted under 35 U.S.C. 154(b) by 346 days.

(21) Appl. No.: 16/596,939

(22) Filed: Oct. 9, 2019

(65) Prior Publication Data

US 2020/0112452 A1    Apr. 9, 2020

Related U.S. Application Data

(60) Provisional application No. 62/743,208, filed on Oct. 9, 2018.

(51) Int. Cl.
*G10L 15/00* (2013.01)
*H04L 12/28* (2006.01)
*G10L 15/22* (2006.01)
*G10L 15/18* (2013.01)
*G10L 15/30* (2013.01)

(52) U.S. Cl.
CPC ........ *H04L 12/282* (2013.01); *G10L 15/1822* (2013.01); *G10L 15/22* (2013.01); *H04L 12/2803* (2013.01); *G05B 2219/2642* (2013.01); *G10L 15/30* (2013.01); *G10L 2015/223* (2013.01); *H04L 2012/2841* (2013.01)

(58) Field of Classification Search
CPC combination set(s) only.
See application file for complete search history.

(56) References Cited

U.S. PATENT DOCUMENTS

| | | |
|---|---|---|
| 5,802,467 A | 9/1998 | Salazar et al. |
| 6,119,088 A * | 9/2000 | Ciluffo .............. G10L 15/26 704/275 |
| 6,157,848 A | 12/2000 | Bareis et al. |
| 6,188,985 B1 | 2/2001 | Thrift et al. |
| 6,535,854 B2 | 3/2003 | Buchner et al. |
| 6,584,439 B1 | 6/2003 | Geilhufe et al. |
| 6,654,720 B1 | 11/2003 | Graham et al. |
| 6,892,083 B2 | 5/2005 | Shostak |
| 6,988,070 B2 | 1/2006 | Kawasaki et al. |
| 7,957,975 B2 | 6/2011 | Burns et al. |
| 8,195,467 B2 | 6/2012 | Mozer et al. |
| 8,285,271 B1 | 10/2012 | Parsadayan et al. |
| 8,296,383 B2 | 10/2012 | Lindahl |
| 8,340,975 B1 * | 12/2012 | Rosenberger .......... G10L 15/22 704/275 |
| 8,645,132 B2 | 2/2014 | Mozer et al. |

(Continued)

*Primary Examiner* — Vu B Hang
(74) *Attorney, Agent, or Firm* — Paul & Paul

(57) ABSTRACT

A management system controls smart devices in a home by speech input without need of an internet connection or wireless or wired router. The system processes audio input and generates command signals for controlling the addressed smart device(s) using an industry standard protocol. The system allows the user to remove or add any kind of smart device within a residential environment.

17 Claims, 5 Drawing Sheets

(56) References Cited

U.S. PATENT DOCUMENTS

| | | | |
|---|---|---|---|
| 8,654,936 B1 | 2/2014 | Eslambolchi et al. | |
| 8,700,399 B2 | 4/2014 | Vermeulen et al. | |
| 8,724,639 B2 | 5/2014 | Mahmoud | |
| 9,007,954 B2 | 4/2015 | Wijting et al. | |
| 9,230,560 B2 | 1/2016 | Ehsani et al. | |
| 9,653,075 B1 | 5/2017 | Chen et al. | |
| 9,747,899 B2 | 8/2017 | Pogue et al. | |
| 10,054,327 B2* | 8/2018 | Nelson | F24F 11/30 |
| 2002/0087319 A1 | 7/2002 | Stephenson | |
| 2003/0095675 A1 | 5/2003 | Marlow et al. | |
| 2004/0019489 A1 | 1/2004 | Funk et al. | |
| 2004/0260538 A1 | 12/2004 | Morse | |
| 2005/0035855 A1 | 2/2005 | Sarnowsky | |
| 2006/0074658 A1 | 4/2006 | Chadha | |
| 2006/0289622 A1 | 12/2006 | Khor et al. | |
| 2007/0005370 A1 | 1/2007 | Elshout | |
| 2010/0075655 A1 | 3/2010 | Howarter et al. | |
| 2013/0325484 A1 | 12/2013 | Chakladar et al. | |
| 2014/0156281 A1 | 6/2014 | Boyd et al. | |
| 2015/0120000 A1 | 4/2015 | Coffey et al. | |
| 2015/0162006 A1 | 6/2015 | Kummer | |
| 2016/0134737 A1 | 5/2016 | Pulletikurty | |
| 2016/0180848 A1 | 6/2016 | Mengibar | |
| 2016/0260135 A1 | 9/2016 | Zomet et al. | |
| 2017/0090864 A1 | 3/2017 | Jorgovanovic | |
| 2017/0193999 A1 | 7/2017 | Aleksic et al. | |
| 2017/0236512 A1 | 8/2017 | Williams et al. | |
| 2019/0196779 A1* | 6/2019 | Declerck | G10L 15/22 |

* cited by examiner

HOME AUTOMATION MANAGEMENT SYSTEM

CROSS-REFERENCE TO RELATED APPLICATION

The present application claims the priority of U.S. Provisional Application for Patent Ser. No. 62/743,208, filed on Oct. 9, 2018, which is incorporated by reference herein in its entirety.

BACKGROUND OF THE INVENTION

1. Field of the Invention

The present invention relates to the control of smart residential lighting and other smart electrical and electronic devices, but without limitation, relates to a system and method for controlling a smart home automation system and other smart apparatus using speech commands and without the need for an internet connection.

2. Brief Description of the Prior Art

Control systems for home offer convenience and safety by allowing control of electrical appliances such as light bulbs and other electronic devices within the home. Presently these control or automation systems manage these devices using Smart Hub/Router with internet connection. The use of Amazon's ECHO, Google's Assistant, Apple Home kit etc., which have speech input through a microphone/s present in these devices, has become common. Speech recognition systems are known, such as those provided by Sensory, Inc. and disclosed in U.S. Pat. No. 8,645,132 B2, incorporated herein by reference. Currently some kind of an intelligent hub may be required to communicate with the various smart devices in the home. Next generation devices such as Amazon Echo, Google Assistant, Apple Home Kit and other manufacturers of speaker-like systems may work without the need for a Smart Hub. These hubs should also be capable of communicating with Amazon Echo, Google Home/Assistant, Apple Home Kit etc., which communicate with servers located in the cloud for interpretation of the speech commands sent by Amazon Echo, Google Assistant, Apple Home Kit etc., using an internet connection. Thus, three things are required for managing the various smart devices at home: A router with internet connection, a smart hub, and devices such as Amazon's Echo, Google's Assistant, Apple's Home Kit, etc. Subsequent generations of Amazon's Echo, Google Assistant and Apple's Home Kit may operate without the requirement of the smart hub. Some smart hubs such as Samsung's Smart Things, etc., may work when internet connection is disrupted, but with limited capabilities. Presently home automation systems control these home automation devices from a centrally located controller using available Wi-Fi routers and internet. The centrally located controller(s) are coupled to the various appliances and devices located throughout the home. An "app" provided on a cellular phone can enable the configuration of the system, for example, assigning names to smart devices located in various areas of the home such as kitchen, family room, etc. Thus, a home automation system may currently be remotely controlled by the app in the cellular phone and establishing an internet connection and communicating commands to the centrally located smart controller that is interfaced to the various appliances and device switches. However, an internet connection may not be available from a home user's location or a home user may choose not to have one because of cost, fear of privacy, hacking, etc. Remembering DTMF sequences is cumbersome. The average cost of a good, reliable and high-speed internet connection varies according to the service provider. The average cost is $50/month. This is a recurring cost. It would be advantageous to have a home control/automation system that is convenient but does not require multiple devices and has no push buttons to memorize and is speech activated/controlled via human audible speech and which does not require an internet connection.

SUMMARY OF THE INVENTION

The present invention, a speech controlled home automation device, provides a management system for controlling various smart devices at home, without the need for internet connection and/or a router. The management system offers transparency in that multiple vendors' smart services can be controlled provided if these smart devices adhere to a common protocol such as ZIGBEE, Zwave, Wi-Fi, Bluetooth, etc. These smart devices include, but are not limited to, lighting systems including light bulbs, smart LED string lights, electrical switches and outlets, thermostats, home security system and its components such as cameras, smart thermostats, entry door locks, etc. The management system of the present invention receives speaker independent speech input commands and trigger words or phrases via human audible speech and sends appropriate control signals to the addressed device.

The management system preferably includes an interface to cellular phones or tablets to receive command signals, within the home, or from a remote location if a remote interface is provided and enabled, to manage any smart device at home. The interface preferable includes an app provided for this purpose. The management system preferably supports most wireless protocols such as Wi-Fi, ZIGBEE, ZWAVE, Bluetooth, BLE etc. Preferably, updates and/or commands for new smart devices can be downloaded using the cellular phone connection to the internet and subsequently to the management system through the cellular phone. Preferably, the management system is not connected to the internet.

In one presently preferred embodiment, the management system of the present invention includes a micro controller (ARM based or otherwise) containing flash memory and RAM memory, an input/output system including an interface to microphone(s) and a smart speaker/s. Preferably, an app or program is provided for a cellular or mobile phone or tablet. Preferably, the app or program can be used to initialize and configure the management system and if enabled, preferably control remote operation of the management system.

According to a further embodiment, the management system preferably transmits a command signal using a protocol, such as ZIGBEE protocol, which is a very popular protocol utilizing the free ISM (industrial, scientific, medical) band of frequencies. The industrial, scientific, and medical radio band ("ISM band") refers to a group of radio bands or parts of the radio spectrum that are internationally reserved for the use of radio frequency (RF) energy intended for scientific, medical and industrial requirements. In the United States this includes the 900 MHz frequencies and the 2.4 GHz frequencies. The ZIGBEE protocol is supported by a very large variety of smart device manufacturers.

Preferably, the management system provides a method for receiving a wake/trigger word via speech input. The wake/ trigger word preferably can be selected from an available set of phrases of words in an app.

Preferably, the speech input is human audible speech, and the speech input is preferably processed to determine input information including a desired action. Preferably, a command signal is generated for controlling the addressed smart device such as a smart lamp or a switch or an outlet, smart thermostats, smart door locks, etc., to perform the desired action.

Preferably, the management system will be in a sleep mode listening for the programmed wake/trigger word. Preferably, the management system acknowledges the spoken wake/trigger word, through the speaker system, when there is a match between the processed wake/trigger phrase or word and the programmed phrase or word. Preferably, the management system provides a visual feedback, for example, such as by way of a green LED light flashing five times when there is a match of the processed phrase/word and the programmed phrase/word.

According to a further embodiment, all the smart devices in the home that adhere to ZIGBEE protocol are scanned, and their information stored in a micro controller flash memory, during the configuration process. This information preferably includes their location and type, as configured initially by an app/program provided in the management system. If the scan does not provide the requested information, the app/program allows the user to manually enter the details of the device(s) such as type, location, etc.

According to a further embodiment, access to the management system via a cellular telephone, tablets such as iPad, etc., locally and through remote access, is provided and protected with a secure password that is setup during the initial configuration process.

Thus, in one aspect the present invention provides a speech-activated, router-free, internet-independent, home automation management system for controlling smart devices, the smart devices being controllable by radio signals, the management system comprising, a speech converting block in software for converting a spoken command phrase to a command signal, the command signal being output by the speech converting block; a microcontroller generating a control signal corresponding to the command signal outputted by said speech converting block; the control signal including identification of a specific smart device being addressed and an action for the specific smart device; an electronic circuit for converting the control signal to a radio signal, compatible with a smart device being addressed; and an electronic circuit for transmitting the radio signal to the specific smart device being addressed.

Preferably, the speech-activated home automation management system includes a speech converting block comprising an electronic circuit including a microphone or an array of microphones. Preferably, the speech-activated home automation management system further comprises at least one speaker for providing audio feedback to a user. Preferably, the speech converting block further comprises a software program that outputs the command signal, in coded digital format, corresponding to the spoken command phrase. Preferably, the microcontroller comprises a microprocessor, memory, and input/output circuitry. Preferably, the input/output circuitry includes at least one of a network interface and a cellular interface. Preferably, the memory includes at least one of RAM memory and flash memory. Preferably, the speech-activated home automation system further comprises a power supply. Preferably, the speech converting block is further adapted for converting a spoken trigger phrase to a trigger signal, wherein said microcontroller enters a set-up/configuration mode in response to the trigger signal outputted by said speech converting block. Preferably, the microcontroller is responsive to the spoken command phrase when said microcontroller is in the set-up/configuration mode. Preferably, the system is adapted to control a plurality of electrical and electronic smart devices, wherein each such smart device can assume any one of a plurality of different states, and wherein said micro-controller is programmed to output a control signal to at least one of said smart devices to assume said one of a plurality of different states responsive to a command phrase. Preferably, the system is adapted to control a light-emitting smart device, wherein the intensity and/or color of the light emitted by the controlled light-emitting smart device can assume any one of a plurality of different intensity levels up to and including the maximum light intensity and/or any one of a plurality of colors, and wherein said microcontroller is programmed to output a control signal to said light-emitting smart device at a user-selected one of the plurality of different intensity levels and/or colors responsive to a command phrase. Preferably, the command phrase is one of a plurality of command phrases, and a different one of the pluralities of command phrases uniquely identifies each of the plurality of different smart devices. Preferably, one or more of the plurality of command phrases is provided for selecting a specific smart device and the functionality of the specific smart device. Preferably, the plurality of command phrases includes one or more command phrases for programming, setting up, or configuring the speech-activated home automation management system. Preferably, the command signal is outputted by said speech converting block is communicated to said microcontroller. Preferably, the home automation management system further comprises an application program for a mobile device, such that the application program enables the mobile device to function as said speech converting block. Preferably, the trigger signal and the command signal are digital signals, each comprising a coded string of text characters representing the text of the spoken trigger phrase and the spoken command phrase, respectively.

DETAILED DESCRIPTION

Figure 1:
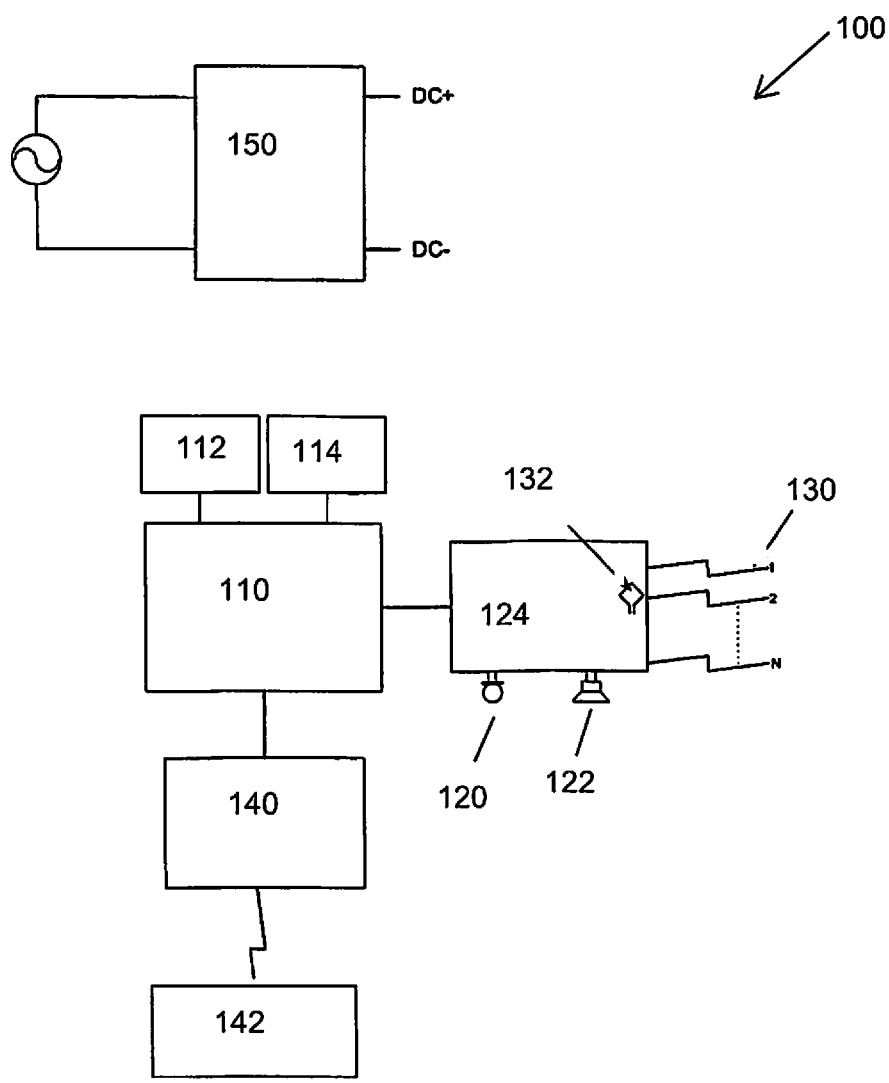
FIG. 1 is a block diagram showing a first embodiment of a home automation management system according to the present invention.

FIG. 1 provides a block diagram showing a home automation management system according to a first embodiment of the present invention. This system communicates with all the smart devices in a house or apartment using the ZIGBEE protocol. The management system accepts human audible speech commands and phrases through a microphone(s) and executes these commands by recognizing them, and preparing and directing corresponding instructions to targeted smart devices. The management system includes a speaker that is used as a feedback. In another embodiment the management system can communicate with the smart devices with a proprietary protocol if the smart device responds to a proprietary protocol when they are supplied by the same vendor as the management system itself.

In the embodiment illustrated in FIG. 1, the management system is shown managing various smart devices. The management system can be typically located centrally, such as in a family room or living room. There can be a plurality of smart electronic and/or electrical devices, such as, for example, table lamps, ceiling lights, ceiling fans, smart thermostats, smart LED string lights and fixtures, etc., located in various rooms. The smart devices have interfaces that are either recognized by the management system or configured initially by the management system. Each of these devices has its own interface, and provides information about that device. The corresponding device interfaces are coupled to the respective devices and they can be activated, deactivated or otherwise managed by the management system.

Preferably, the initial setup of the management system is very simple. The initial setup preferably only requires the use of a cellular telephone and an app that can be downloaded. The initial setup preferably allows establishing a "wake/trigger word/phrase" from an available set of choices. The management system preferably gives a feedback through its speakers of the received speech input. Such choices can be, for example, "Hello Genie," "Hello Chroma18," etc.

FIG. 1 is a block diagram of a first embodiment of a home automation management system 100 of the present invention. The management system 100 includes a microcontroller/microprocessor (such as, for example, ARM Cortex M4 or others) 110 with DRAM memory 112 and flash memory 114. The management system includes an array of microphones 120 and a speaker system 122 as part of an input and output system 124. The input/output system 124 communicates with the various smart devices in the user's residence, such as LED light bulbs, thermostats, video doorbells, entry door locks etc. (not shown) by radio transmission through wireless signals 134 and a loop antenna 132. The management system includes Wi-Fi/Bluetooth/BLE capability, provided by a Wi-Fi IC interface 140, to connect to a cellular phone 142, and a conventional USB power supply 150.

Figure 2:
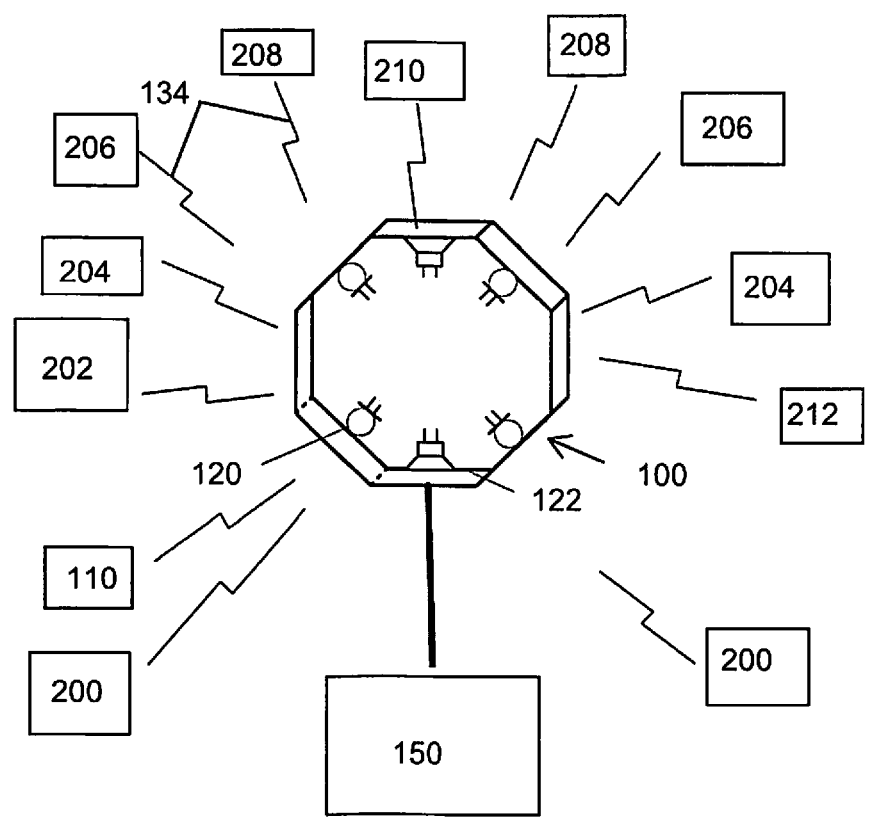
FIG. 2 is a block diagram showing an implementation of the home automation management system of FIG. 1 used to control sundry smart devices.

FIG. 2 is a block diagram illustrating an implementation of the home automation management system 100 of the present invention, schematically showing speech commands being implemented during a setup process. The various smart home devices, that are ZIGBEE-certified, are shown. These include smart lights 200, a smart thermoset 202, smart recessed lights 204, smart outlets 206, smart table lamps 208, a smart door lock 210, and a smart video doorbell 212. During initial set up the owner/user has the option of choosing a trigger phrase/word, a password for remote access and location and type of smart devices that are to be managed by management system 100. The management system 100 confirms each of the configuration choices through the speakers 122. In this embodiment, the user uses a mobile or cellular phone 110, provided with an appropriate app to control the smart devices. The cellular phone 110 communicates directly with the management system 100 with encoded, secure command signals to manage the addressed device. A wall-mounted power supply 150 powers the management system 100.

Figure 3:
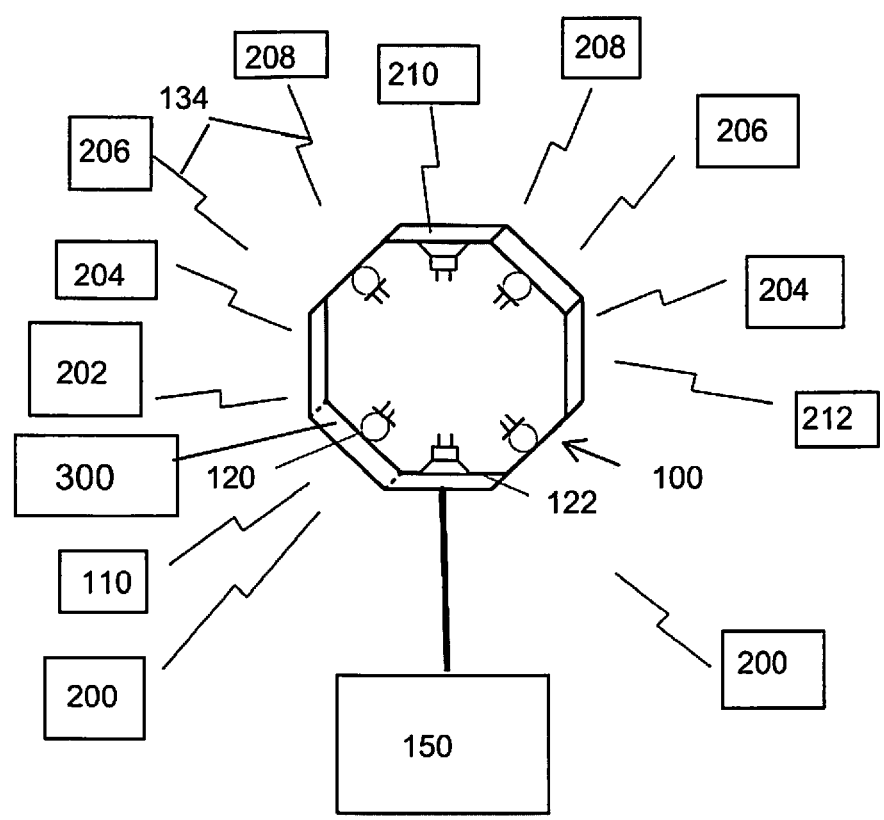
FIG. 3 is a block diagram showing the home automation management system of FIG. 2 being controlled by a user's voice.

FIG. 3 is a block diagram illustrating an embodiment of the management system 100 utilized by speech commands that are audible human speech for controlling the management system 100. The management system 100 is designed so that a user 300, such as the owner of house, can control the various devices through their interfaces using speech commands that are human audible speech.

Figure 4:
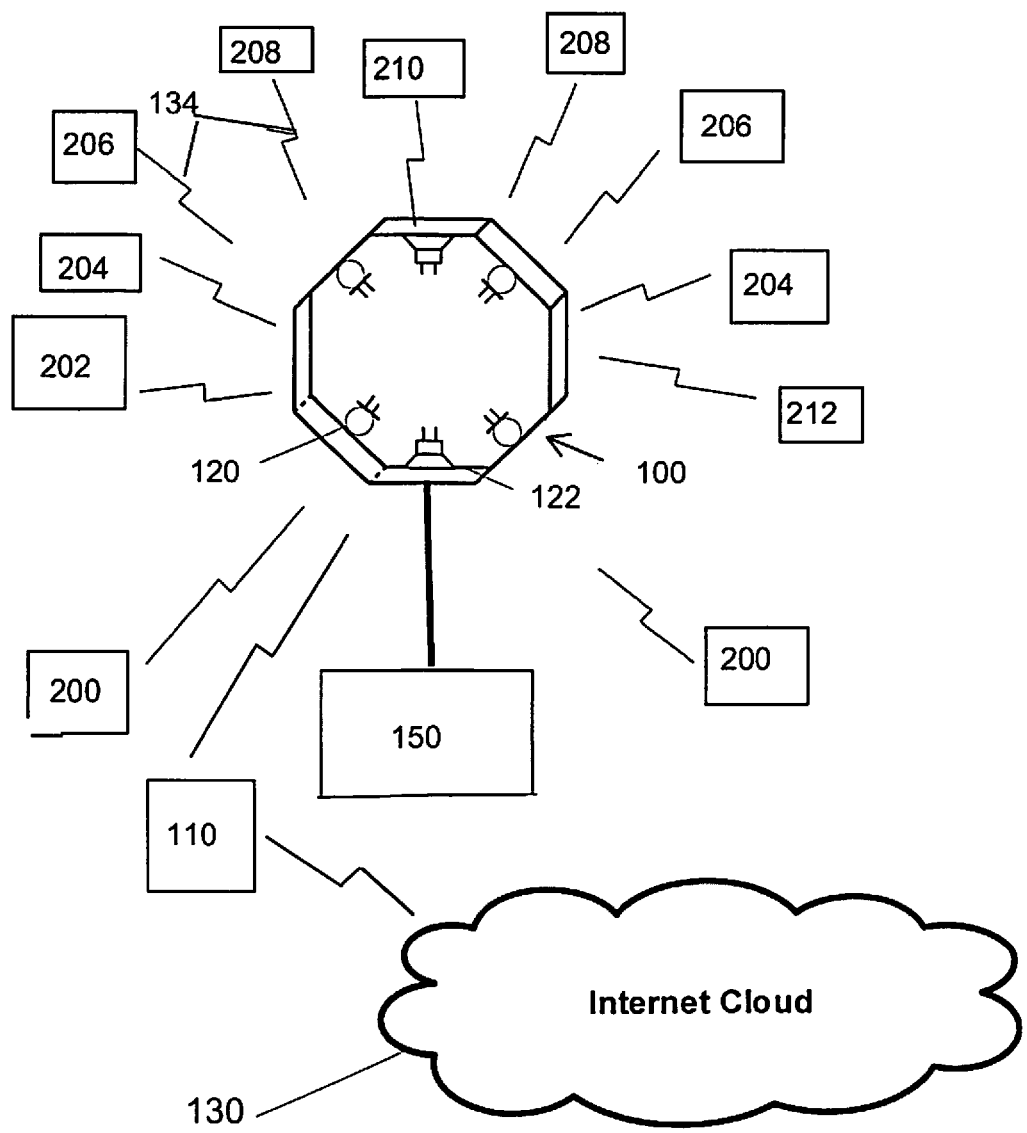
FIG. 4 is a block diagram showing the home automation management system of FIG. 2 in communication with the internet for updating software controlling the management system and/or one or more of the smart devices controlled by the management system.

FIG. 4 is a block diagram showing an embodiment of the management system 100 connected to the Internet and an authenticated user running the app provided on the cellular/mobile phone 110 according to the present invention. In this embodiment the mobile phone is connected to the internet. The mobile phone 110 uses two different protocols to access the Internet, Wi-Fi, and Bluetooth to communicate with the management system 100. The app in the mobile phone 110 uses Wi-Fi protocol to connect to the router and Bluetooth to communicate with the management system 100. The app serves as a gateway. The smart devices at home, which are connected to the management system 100, are not connected to the internet. In this embodiment any new device commands, updates etc., are downloaded to the phone and subsequently communicated to the management system to transfer the downloads and updates.

Figure 5:
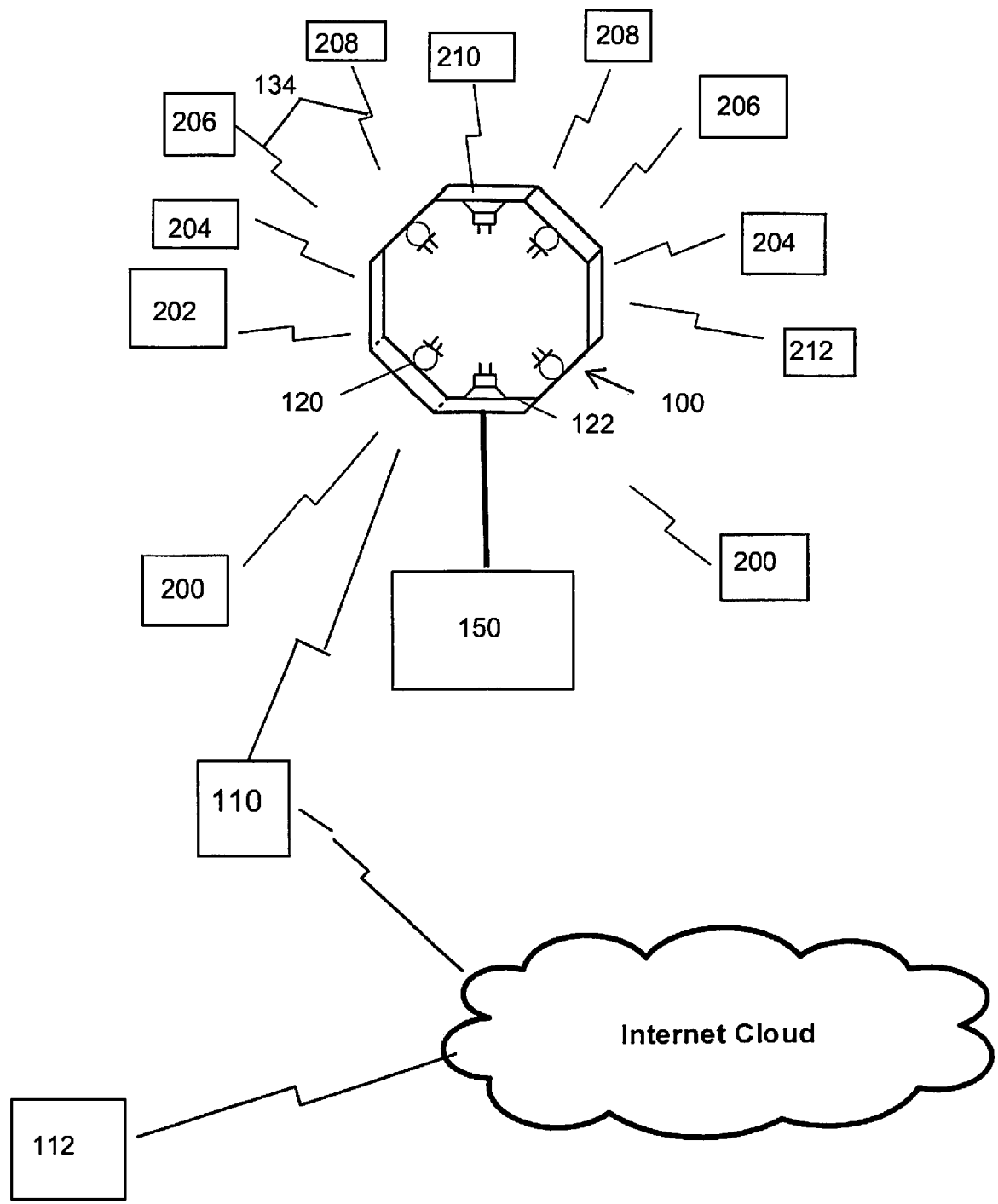
FIG. 5 is a block diagram showing the home automation management system of FIG. 2 being accessed remotely over the internet by a remote user.

Another embodiment of the present invention is shown in FIG. 5, which is a block diagram of the use of an Internet connection used in connection with the present invention. In this embodiment, the management system communicates with the Wi-Fi router in the house, which after proper authorization is connected to the internet 130. An authenticated user can remotely manage any of the smart devices in the house that are connected to the management system 100.

In this embodiment the user can, as described above, and if permitted with proper security credentials, remotely access using another cellular phone 110 or like device, any smart device in the house that is connected to the management system 100, through an internet connection and the app provided for that purpose. In this embodiment an existing wireless router that has an internet connection is used. However, there may be a risk associated with this scheme as the relevant server in the cloud associated with the service providing access to the server, such as Amazon Echo or similar Amazon products, Google Home/Assistant and Apple Home Kit, etc., may be subject to cyber security risk or hacking. The APP is used to remotely manage the smart devices connected to the management system.

Preferably, the management system detects the user being home either by a room presence sensor or through user speech. After this recognition the management system disconnects itself from the internet.

In another embodiment the management system, because of its support of multiple wireless protocols, can manage smart devices from multiple vendors such as Philips Hue, Samsung SmartThings, Nest Thermostats etc., and any home automation device that is ZIGBEE-certified.

Various modifications can be made in the details of the various embodiments of the management systems of the present invention, all within the scope and spirit of the invention as defined by the appended claims.

The invention claimed is:

1. A speech-activated, router-free, internet-independent, home automation management system for controlling smart devices, the smart devices being controllable by radio signals, the management system comprising:

a speech converting block in software for converting a spoken command phrase to a command signal, the command signal being output by the speech converting block;

a microcontroller generating a control signal corresponding to the command signal outputted by said speech converting block; the control signal including identification of a specific smart device being addressed and an action for the specific smart device;

an electronic circuit for converting the control signal to a radio signal, compatible with a smart device being addressed;

an electronic circuit for transmitting the radio signal to the specific smart device being addressed, and wherein said speech converting block is further adapted for converting a spoken trigger phrase to a trigger signal, and wherein said microcontroller enters a set-up/configuration mode in response to the trigger signal outputted by said speech converting block, wherein the home automation management system is adapted to connect to the internet for remote management, and wherein the home automation management system is adapted to disconnect itself from the internet when a user is detected being home.

2. A speech-activated home automation management system according to claim 1 wherein said speech converting block comprises an electronic circuit including a microphone or an array of microphones.

3. A speech-activated home automation management system according to claim 1 further comprising at least one speaker for providing audio feedback to a user.

4. A speech-activated home automation management system according to claim 1 wherein said speech converting block further comprises a software program that outputs the command signal, in coded digital format, corresponding to the spoken command phrase.

5. A speech-activated home automation management system according to claim 1 wherein said microcontroller comprises a microprocessor, memory, and input/output circuitry.

6. A speech-activated home automation management system according to claim 5, wherein said input/output circuitry includes at least one of a network interface and a cellular interface.

7. A speech-activated home automation management system according to claim 5, wherein said memory includes at least one of RAM memory and flash memory.

8. A speech-activated home automation management system according to claim 1, wherein the speech-activated home automation system further comprises a power supply.

9. A speech-activated home automation management system according to claim 1, wherein said microcontroller is responsive to the spoken command phrase when said microcontroller is in the set-up/configuration mode.

10. A speech-activated home automation management system according to claim 1, wherein said system is adapted to control a plurality of electrical and electronic smart devices, wherein each such smart device can assume any one of a plurality of different states, and wherein said microcontroller is programmed to output a control signal to at least one of said smart devices to assume said one of a plurality of different states responsive to a command phrase.

11. A speech-activated home automation management system according to claim 1, wherein said system is adapted to control a light-emitting smart device, wherein the intensity and/or color of the light emitted by the controlled light-emitting smart device can assume any one of a plurality of different intensity levels up to and including the maximum light intensity and/or any one of a plurality of colors, and wherein said microcontroller is programmed to output a control signal to said light-emitting smart device at a user-selected one of the plurality of different intensity levels and/or colors responsive to a command phrase.

12. A speech-activated home automation management system according to claim 1, wherein the command phrase is one of a plurality of command phrases, and a different one of the pluralities of command phrases uniquely identifies each of the plurality of different smart devices.

13. A speech-activated home automation management system according to claim 12, wherein one or more of the plurality of command phrases is provided for selecting a specific smart device and the functionality of the specific smart device.

14. A speech-activated home automation management system according to claim 12 wherein the plurality of command phrases includes one or more command phrases for programming, setting up, or configuring the speech-activated home automation management system.

15. A speech-activated home automation management system according to claim 1, wherein the command signal outputted by said speech converting block is communicated to said microcontroller.

16. A speech-activated home automation management system according to claim 1, further comprising an application program for a mobile device, such that the application program enables the mobile device to function as said speech converting block.

17. A speech-activated home automation management system according to claim 1, wherein the trigger signal and the command signal are digital signals, each comprising a coded string of text characters representing the text of the spoken trigger phrase and the spoken command phrase, respectively.

* * * * *